United States Patent [19]

Nagata

[11] Patent Number: 5,138,696
[45] Date of Patent: Aug. 11, 1992

[54] PRINTER PROVIDED WITH FONT MEMORY CARD

[75] Inventor: Masato Nagata, Tokyo, Japan

[73] Assignee: Oki Electric Industry Co., Ltd., Tokyo, Japan

[21] Appl. No.: 780,854

[22] Filed: Oct. 18, 1991

[30] Foreign Application Priority Data

Oct. 19, 1990 [JP] Japan .................................. 2-279423

[51] Int. Cl.⁵ .......................................... G06K 15/00
[52] U.S. Cl. ...................................... 395/110; 395/115
[58] Field of Search ............... 395/101, 110, 115, 116, 395/150, 151, 164–166; 340/735, 747, 748; 382/56; 400/61, 62, 76

[56] References Cited

U.S. PATENT DOCUMENTS 4,660,998  4/1987  Tsuneki ................................. 395/110
4,881,069  11/1989  Kameda et al. ..................... 340/748

Primary Examiner—Arthur G. Evans
Attorney, Agent, or Firm—Edward D. Manzo

[57] ABSTRACT

A printer provided with a font memory card having an outline font ROM for storing data representing outlines of characters and control parameters and a bit map font memory card detachably connected to the printer by way of a connector. This printer generates print bit map font data corresponding to print fonts which is instructed by a host unit such as a personal computer and the thus generated bit map font data are stored in the bit map font memory card in the order of priority of frequent use thereof.

10 Claims, 10 Drawing Sheets

Fig. 4

FONT ATTRIBUTE ADDRESS TABLE

| 201 | 210 | 220 | 230 | 240 | 250 |
|---|---|---|---|---|---|
| $TF_1$ | $SZ_1$ | $f_1$ | $SAD_1$ | $EAD_1$ | $Q_1$ |
| $TF_2$ | $SZ_2$ | $f_2$ | $SAD_2$ | $EAD_2$ | $Q_2$ |
| $TF_3$ | $SZ_3$ | $f_3$ | $SAD_3$ | $EAD_3$ | $Q_3$ |
| ⋮ | ⋮ | ⋮ | ⋮ | ⋮ | ⋮ |
| $TF_n$ | $SZ_n$ | $f_n$ | $SAD_n$ | $EAD_n$ | $Q_n$ |

| 301 | 310 | 320 |
|---|---|---|
| $CD_1$ | $BSAD_1$ | $BQ_1$ |
| $CD_2$ | $BSAD_2$ | $BQ_2$ |
| ⋮ | ⋮ | ⋮ |
| $CDm$ | $BSADm$ | $BQm$ |

| 330 | 340 | 350 |
|---|---|---|
| $CD_1$ | $BSAD_1$ | $BQ_1$ |
| $CD_2$ | $BSAD_2$ | $BQ_2$ |
| ⋮ | ⋮ | ⋮ |
| $CDm$ | $BSADm$ | $BQm$ |

~300

PRINTER PROVIDED WITH FONT MEMORY CARD

BACKGROUND OF THE INVENTION

The present invention relates to a printer for printing characters one at a time to full page format by converting outline font data into bit map font data which is printed in every page.

A so-called electrophotographic printer has recently come into wide use for forming an electrostatic image on a photosensitive drum with use of a laser beam or the light of an LED in order to print printing data prepared by a personal computer, a word processor and the like on a print sheet.

The electrophotographic printer employs function formulae such as Bezier Mathematical Curves, Spline Mathematical Curves and the like which represent the outline of characters instead of the conventional dot matrix fonts (bit map fonts), and an outline font for storing therein connection points of the function formulas, and parameters and the like for controlling the connection points. Using this outline font, it is possible to change the sizes and formats of characters such as bold face and hollow outline with ease. However, the use of this outline font has the drawback of long processing times needed to generate bit map data based on this outline font. To solve the problem, a font cache memory is provided for avoiding the generation of the bit map font from the outline font when the same characters are reused, thereby to speed up the processing speed. That is, the first time that the bit map font is generated, the thus generated bit map font is stored in the font cache memory. When the same characters are printed again, they can be printed based on the bit map dated font in the font cache memory, thereby facilitating high speed printing.

Conversion of the outline fonts into the bit map fonts having the specific sizes is done using routines (and/or data) which are previously stored in the program for controlling the printer. Once the printer is turned on, the outline fonts are converted into the bit map fonts having the specific sizes which are instructed by the control program and stored in a font cache memory. When the printer (thereafter) receives a printing character code from a host unit such as a personal computer or word processor, the outline fonts will already have been converted into the corresponding bit map fonts.

Since the conventional printers are controlled by a variety of application programs, font types and character sizes are differentiated corresponding to the application programs to be used in the printers. The font types and the character sizes are also differentiated by users of the printers. Accordingly, even if the outline fonts are converted into the bit map fonts, the bit map fonts are not frequently used.

Since the types of the bit map fonts which are previously converted and stored in the printer are specified, the use of them results in a waste of time unless they match the type of the fonts to be used by the user.

SUMMARY OF THE INVENTION

It is a first object of the present invention to provide a printer having bit map fonts corresponding to a variety of application programs.

It is a second object of the present invention to provide a printer capable of converting outline fonts into bit map fonts without taking much time when the application program or the user is changed.

The printer of the present invention comprises an outline font ROM (Read Only Memory) for storing therein data representing outlines of character and control parameters and a bit map font memory card detachably connected to the printer, such as by way of a connector attached thereto. One feature of the invention is generating bit map font data for printing, based on the data stored in the outline font ROM, and storing the generated bit map font data in the bit map font memory card in the order of priority of frequent use thereof.

With such an arrangement, the font selected and instructed by the host units such as personal computers or word processors is generated as the bit map font data based on the data stored in the outline font ROM and is stored in the bit map font memory card. At this time, since the bit map font data is stored in the order of priority of frequent use thereof for every font type and character size, it is possible to provide a printer having bit map fonts corresponding to a variety of application programs and to provide a printer capable of reducing time involved in conversion from the outline font into the bit map font of the printer when the application program or the user is changed.

BRIEF DESCRIPTION OF THE DRAWINGS

FIG. 4 is a table showing in detail font attribute addresses in the storage area of FIG. 3;

FIGS. 5(A) and 5(B) are each examples of character attribute address tables in the storage area of FIG. 3;

DESCRIPTION OF THE PREFERRED EMBODIMENT

Figure 1:
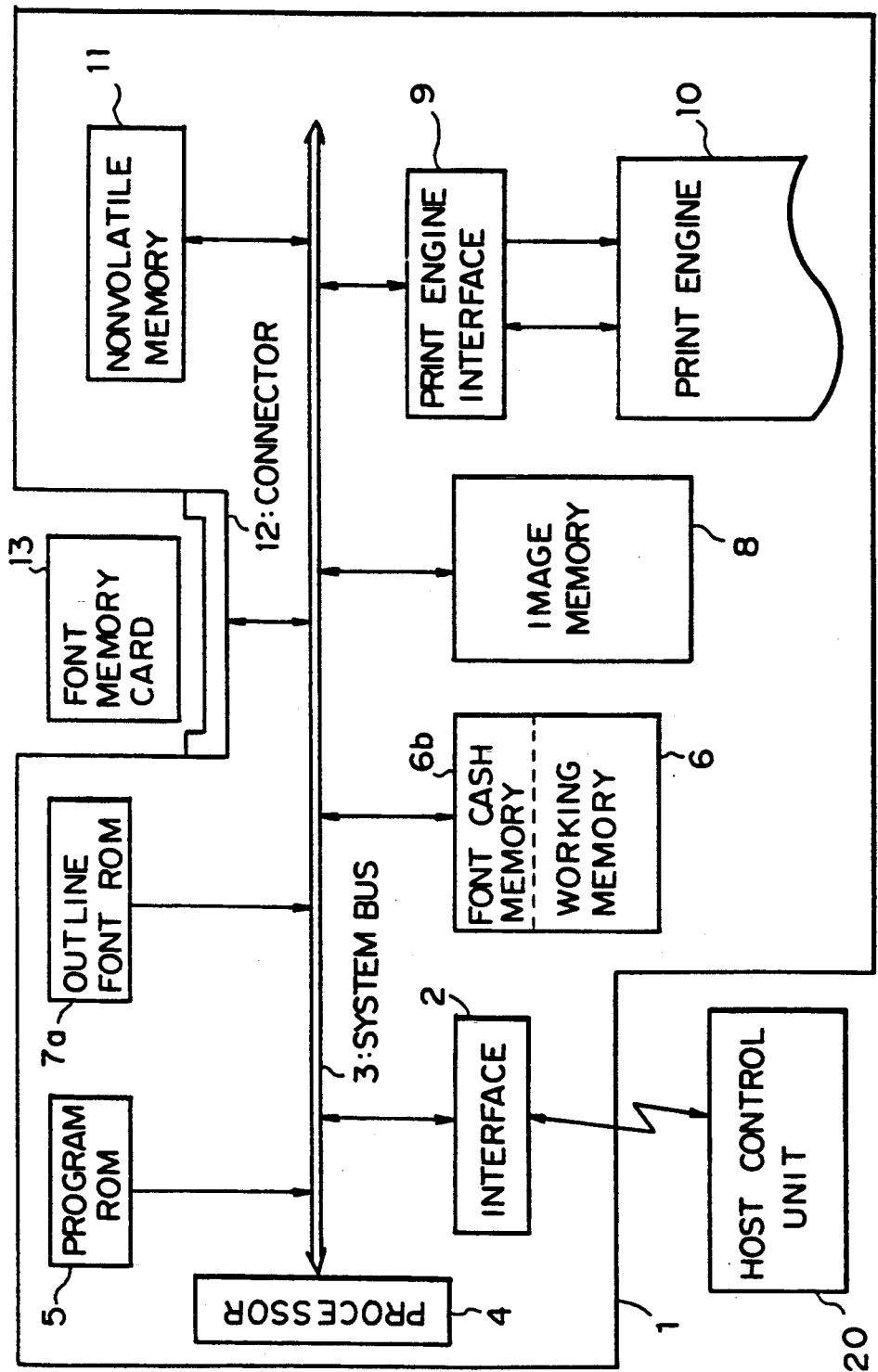
FIG. 1 is a block diagram of a printer according to an embodiment of the present invention.

A printer according to a preferred embodiment of the present invention will be described with reference to FIGS. 1 to 8.

A printer 1 comprises an interface 2 connected to a host unit 20, a system bus 3 connected to the interface 2, a microprocessor 4, a program ROM 5, a working memory 6, an outline font ROM 7a, an image memory 8, a print engine interface 9, a battery backupped nonvolatile memory 11 and a connector 12 coupled to the system bus 3. Also, a font memory card 13 is detachably connected to the printer 1 by way of the connector 12.

The host unit 20 comprises a personal computer, a word processor, an image reader and the like for preparing data for printing.

Figure 2:
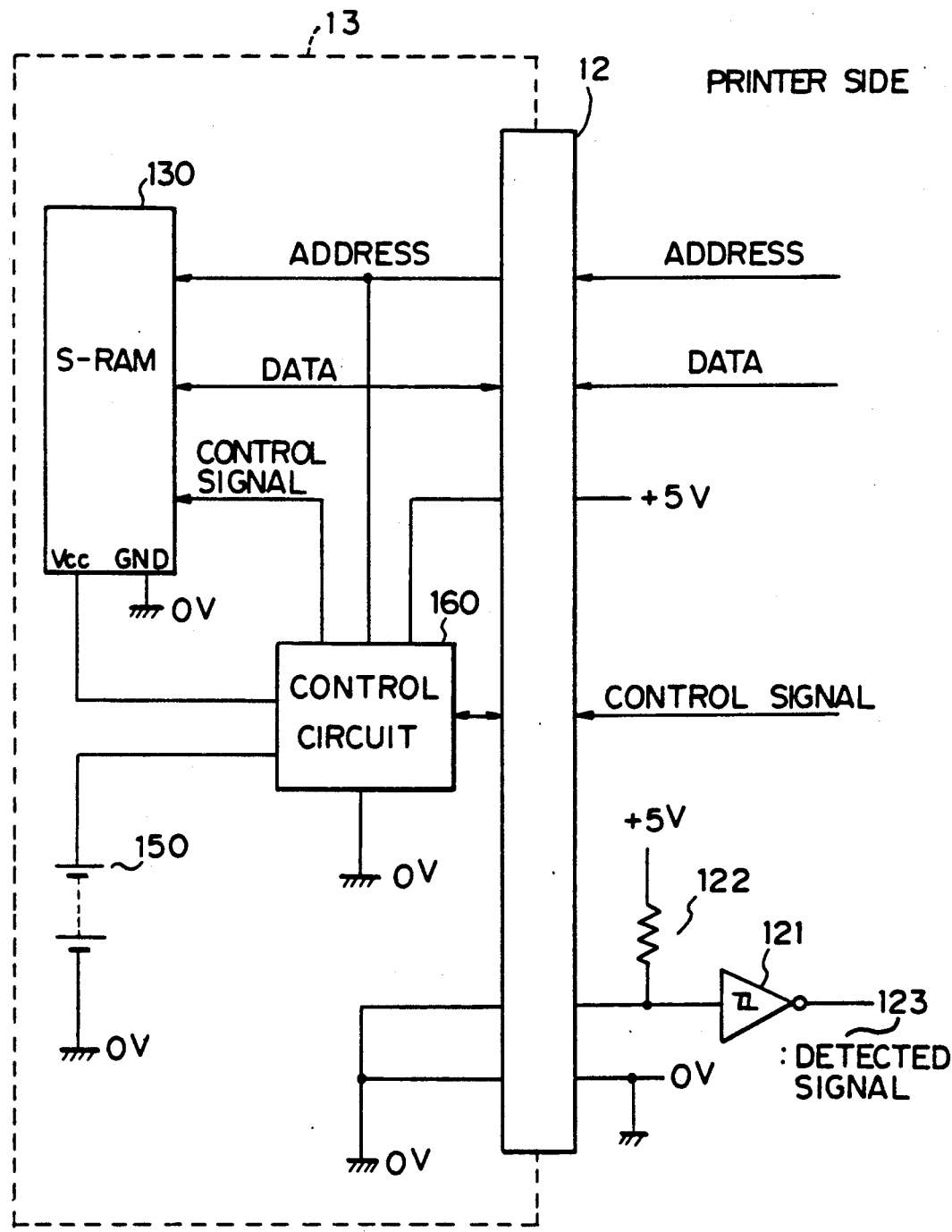
FIG. 2 is a block diagram of a font memory card employed in the printer according to the present invention.

The interface 2 is an interface circuit illustratively comprising a well-known RS232C Interface, a parallel interface, or the like. Bus 3, connected to interface 2, may comprise address and data portions (as seen in FIG. 2).

The microprocessor 4 is a control circuit for controlling each element of the printer 1. Its control program is stored in the program ROM 5. The working memory 6 is a memory for storing and managing data exchanged between the host unit 20 and the working memory 6 by way of the interface 2. The outline font ROM 7a stored therein function expressions such as Bezier Mathematical Curves and Spline Mathematical Curves for representing outlines of the characters, connection points, parameters for controlling them and the like.

The processor 4 generates bit map font data for printing based on the function expressions and the parameters when it receives printing character codes from the host unit 20. The font cache memory 6b is a cache memory for temporarily storing the thus generated bit map font data and forms a part of the working memory 6. The image memory 8 comprises a RAM (Random Access Memory) for storing printing data, e.g. for one page which are edited and imaged by the processor 4. The print engine 10, which carries out printing on printing sheets based on the printing data stored in the image memory 8, comprises a printing sheet feeding system, printing process means for electrophotographic printing and the like. The print engine interface 9 is an interface circuit which reads the printing data from the image memory 8 in accordance with the instruction from the processor 4 and transfers the thus read data to the print engine 10. The print engine interface 9 receives print control signals from the print engine 10, sends print control signals to the processor 4, receives instructions from the processor 4, and transfers instructions to the print engine 10.

The nonvolatile memory 11 comprises the memory and the like backupped by the battery as mentioned above and stores data for initializing the printer 1 when the power is turned on. The font memory card 13 is composed of a nonvolatile memory and selects the bit font data stored in the font cache memory 6b or in the font memory card 13 itself based on the frequency of use thereof, and stores the bit map font data therein, described later.

Described hereinafter is the case where the font memory card 13 comprises memory with battery back-up.

FIG. 2 is a block diagram of the font memory card detachably attached to the printer of the present invention.

The font memory card 13 comprises a static random access memory 130 (hereinafter referred to as S-RAM), a battery 150 and a control circuit 160. The S-RAM 130 is connected to an address bus and a data bus of the system bus 3 (refer to FIG. 1) of the printer 1 by way of the connector 12 and receives operating voltage (VCC) and various control signals such as a read signal, a write signal and a chip select signal from the control circuit 160. The control circuit 160 is connected to the system bus 3 and the power supply (+5 V) of the printer 1 and also to the battery 150. The control circuit 160 decodes address signals and generates the control signals such as the read signal and the write signal which are supplies to the S-RAM 130. In addition, control circuit 160 couples a supply voltage to the S-RAM font memory card even if the font memory card 13 is detached from the connector 12. As such, font memory card 13 is essentially a nonvolatile memory card, at least in operation. The font memory card 13 issues a signal for detecting the insertion of the card.

One of the terminals of the font memory card 13 is connected to 0 V whereas another terminal may be connected to a detecting signal 123 issued by a pull-up resistor as illustrated in FIG. 2, and to a Schmitt trigger type inverter 121 connected to the printer side. In this case, the processor 4 decides the presence of the font memory card 13 by a sensing or interrupt operation.

Figure 3:
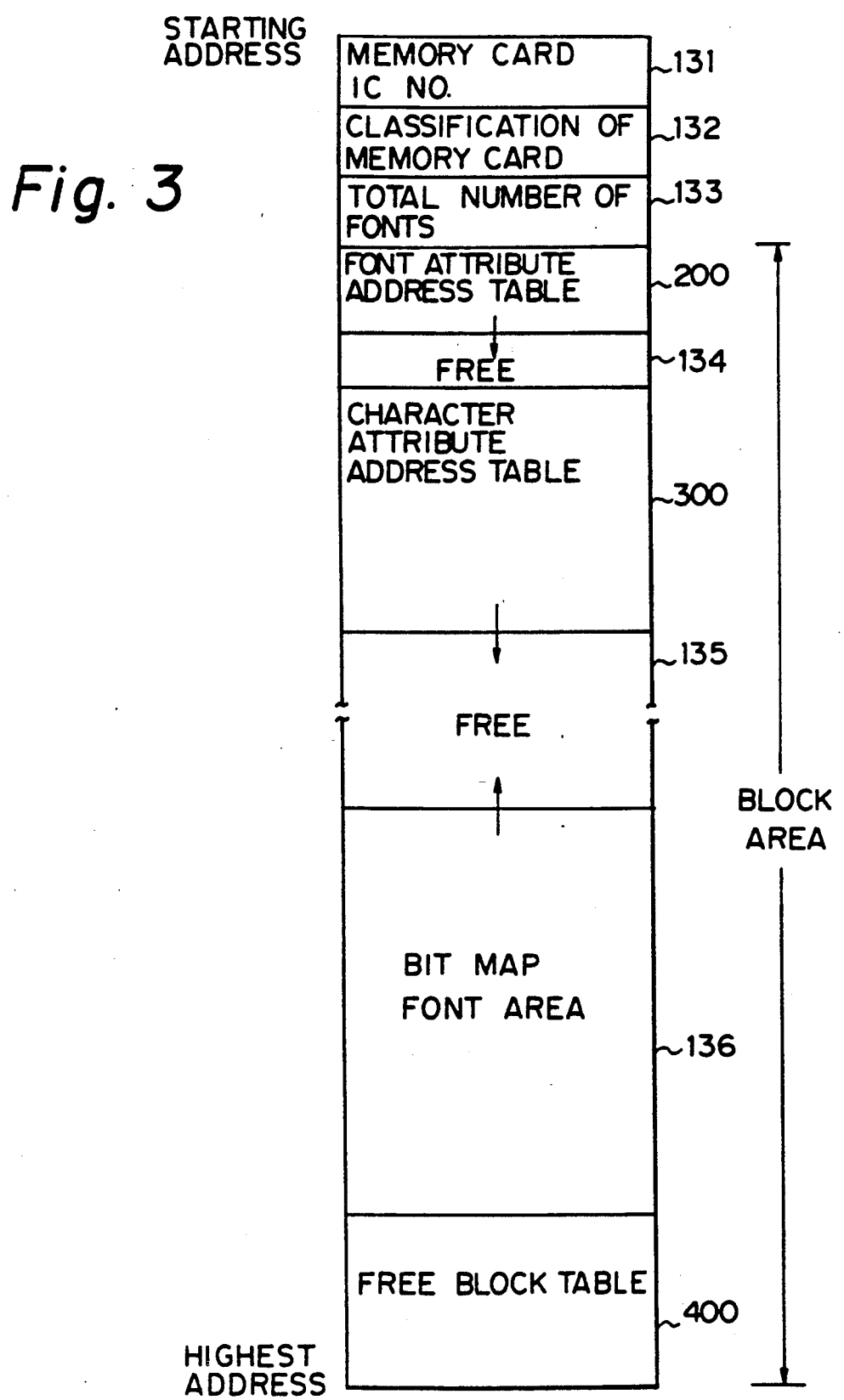
FIG. 3 is a representative sketch showing storage area allocations of the stored data in the memory card of FIG. 2.

FIG. 3 represents a storage area for data stored in the S-RAM 130.

The S-RAM 130 comprises several elements. Beginning at a starting address shown at the top of FIG. 3, S-RAM 130 includes a memory card identification (ID) number storage area 131 for storing user's information of the font memory card 13 and the like. A memory card type information storage area 132 is provided for storing data for distinguishing one type of memory card from other memory cards formed of a mask ROM or the like. Information about the storage capacity of the font memory card 13 may be contained in storage area 132. Next, a total font number storage area 133 is provided for storing a number called the total font number. This represents the number of types of fonts stored in the font memory card 13. The S-RAM 130 further comprises the following elements next to the total font number storage area 133: a font attribute address table area 200 for storing a managing number given to each font type stored in the font memory 13, the number of frequency of use, starting and ending addresses of the character attribute address table, described later, and a free area 134 as a spare area of the font attribute table 200. Following by the free area 134 are a character attribute address table 300 for storing a character code managing number corresponding to a character set table, a block address number representing the block where the bit map font data corresponding to the character code managing number is stored and the number of blocks to be used, a free area 135 as a spare area of the character address table area 300, a bit map font area 136 for storing various bit map fonts and a free block retrieve table area 400 for dividing the areas extending from the font attribute address table 200 to the bit map font area 136 every r bytes, r being an integer. Free block retrieve table area 400 also stores free block retrieve flags which represent information about the unused blocks among the bit mag font blocks.

Components of each table will be described more in detail hereinafter.

FIG. 4 shows the font attribute address table 200, FIG. 5(A) shows a character attribute address table 300 and 5(B) shows another character attribute address table 300.

The contents of the attribute address table 200 will be described from left column to right column thereof as illustrated in FIG. 4. The attribute address table 200 comprises a first column 201 for storing type codes ($TF_1$ to $TF_n$), i.e., numbers for managing font types (type faces), a second column 210 ($SZ_1$ to $SZ_n$) for storing font sizes, and a third column 220 for storing frequencies of use of a combination of a certain type code $TF_3$ and a certain font size $SZ_e$.

The attribute address table 200 further comprises a fourth column 230 for storing the address SAD which represents the *starting* address of the memory area to store the character attribute address table 300 relating to the combination of the font size $SZ_e$ and the type code $TF_e$. A fifth column 240 is used for storing the *ending* address of the character attribute address table 300, the starting address of which is stored in the column 230. A sixth column 250 is provided for storing memory capacities ($Q_1$ to $Q_n$) which are the totals of the memory capacities used for the character attribute address table represented by combinations of the $TF_e$ and the $SZ_e$, and the memory capacities used for the corresponding bit map fonts. It will be understood that references herein to "first," "second," etc. are not intended to limit the precise organization of columns, but is used to facilitate description.

The font attribute address table 200 as illustrated in FIG. 4 comprises n rows which may be used for n types of fonts or n combinations of font types with associated character sizes. This is advantageous in cases where the font types are same but the character sizes are differentiated. Thus, font attribute address table 200 can be used to represent, for example, font "1" is size "1" and font "2" in sizes "1", "2" and "3, " thus using only four rows. Obviously a greater number of rows can be used based on the size (memory capacity) of SRAM 130.

As shown in FIG. 3, the character attribute address table 300 is the table representing the storage addresses of the bit map fonts corresponding to the font character codes specified by the combination of the font types ($TF_n$) and sizes of characters ($SZ_n$). Accordingly, the character attribute address table exemplifies, as illustrated in FIG. 5(A), the combination of the font types $TF_1$ and the character sizes $SZ_1$ in the table of FIG. 4. The character attribute address table 300 comprises a first column 301 for storing character codes (character managing numbers $CD_1$ to $CD_n$) representing codes corresponding to the character set table, not shown; a second column 310 for storing block start addresses BSADs which represent starting addresses in which bit map fonts corresponding to the character codes stored in the column 301, and a third column 320 representing memory capacities BQs of the bit map font data which correspond to the character codes stored in the areas of Table 300. The combinations thereof are as numerous as the number of characters, i.e. m. Accordingly, $SAD_1$ of the font attribute address table 200 (FIG. 4) represents the address of $CD_1$ while the $EAD_1$ represents the address of $BQ_1$.

Likewise, the character attribute address table 300 formed by the combination of the type of font $TF_2$ and the character sizes $SZ_2$ is illustrated in FIG. 5(B).

The number of character attribute address tables 300 (FIGS. 3 and 5) corresponds to the number of combinations of n TFs and n SZs (FIG. 4).

Figure 6:
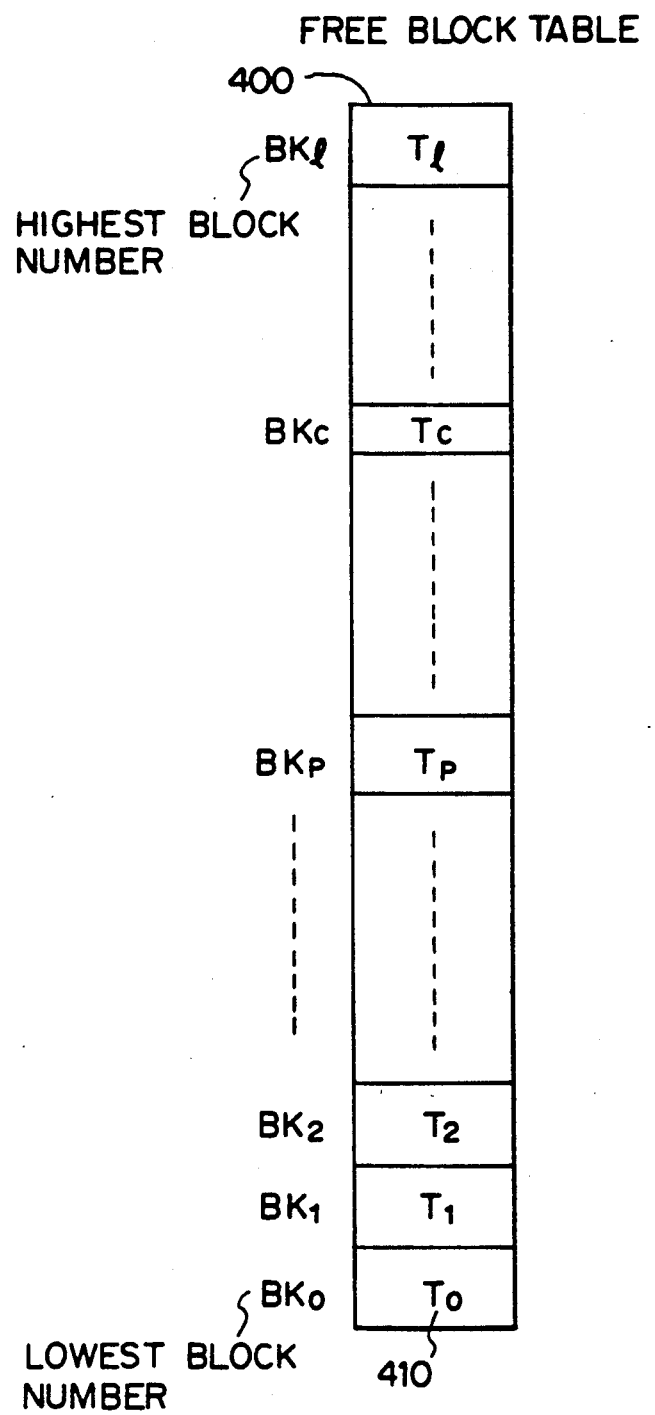
FIG. 6 is a representation showing in detail an empty block table of FIG. 3.

FIG. 6 is a view showing a free block table.

An arrangement of the free block 400 of FIG. 3 will be described more in detail with reference to FIG. 6.

The free block table is in the table for storing the flag T indicating whether the blocks $BK_o$ to $BK_l$ are used or not, wherein the blocks $BK_o$ to $BK_l$ mean the blocks formed by dividing the bit map font area 136, the character attribute address table 300, the font attribute address table 200 and the free areas 134 and 135 by r bytes.

The flag T indicates that the free area is not used if T is a logical "0" and the free area is used if T is logical "1". The flag T is formed of data comprising more than one bit in the preferred embodiment.

Figure 7:
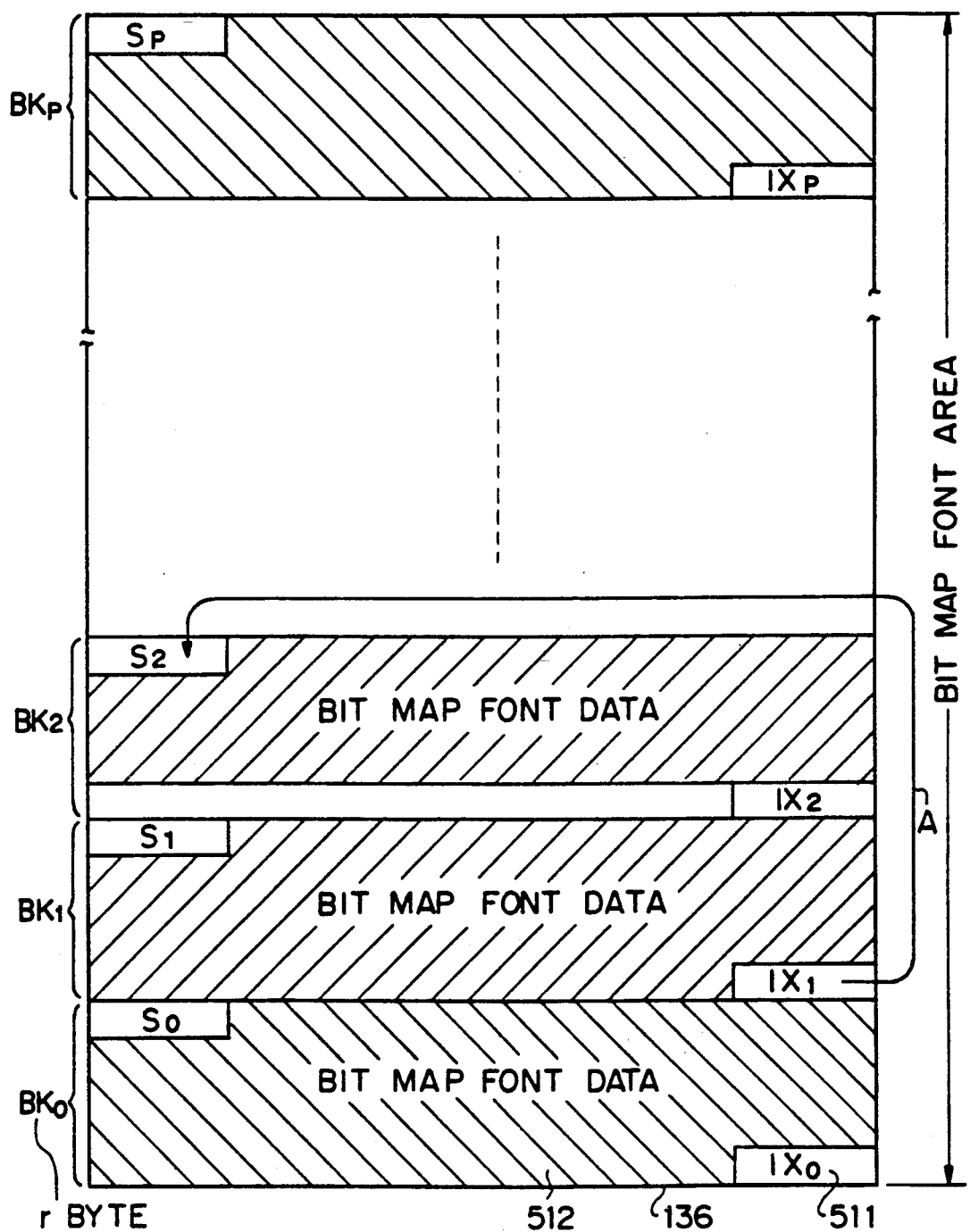
FIG. 7 is a representation showing in detail an arrangement of a bit map font area of FIG. 3.

The bit map font area 136 (FIG. 3) for storing the bit map font data will be described with reference to FIG. 7 showing the structure of the bit map font data.

The bit map font area 136 is the area where the bit map fonts of all the pairs composed of the font types TFs and the character sizes SZs of the font attribute address table are stored. Area 135 is divided into blocks $BK_o$ to $BK_p$ every r bytes. A block among the blocks, e.g. the block $BK_o$ stores in the starting address $S_o$ thereof the numbers of bytes to be actually used therein. A logical "0" is stored in an index register $IX_o$ (marked with reference numeral 511) located in the ending address of the block $BK_o$ when the bit map data corresponding to the character code CD can be stored in the block $BK_o$. However, a starting address of the next block is stored in the index register $IX_o$ located in the ending address of the block $BK_o$ when the bit map data corresponding to the character code CD can not be stored in the block $BK_o$. An arrow A shows that the index register indicates the starting address of the next block for storing the remainder of the bit map font data when the bit map data corresponding to the character code CD can not be stored in the block $BK_o$. In FIG. 7, bit map font data are to be stored in area 512.

An operation of the printer having the arrangement as illustrated in FIGS. 1 to 7 will be described with reference to FIGS. 8(A) to 8(C).

The processor 4 starts an initialization processing step S101, after the power supply is turned on, based on initializing data stored in the program ROM 5 or the nonvolatile memory 11 in the same manner as the conventional printer. At this time, the fonts of the font types and character sizes to be prepared as the bit map font are read from the outline font ROM 7a based on the data stored in the non-volatile memory 11, converted into the bit map font and stored preliminarily in the font cash memory 6b (S 102).

The processor 4 judges, upon reception of a message by way of the interface 2 relating to the printing instruction from the host unit 20 (S 103), as to whether the font specified by the host unit 20 is previously stored in the font cash memory 6b based on the data of font types and the character sizes received from the host unit 20. (S 104)

If the processor 4 decides that the font instructed to print by the host unit 20 has been previously stored in the font cache memory 6b,. the processor 4 reads the bit map font data from the font cache memory 6b and writes the thus read bit map font data in the image memory 8 (S 105). Accordingly, the printing is carried out with use of the bit map font which was previously stored in the font cache memory 6b.

If the processor 4 decides that the font specified for printing by the host unit 20 is not stored in the font cache memory 6b, the processor 4 investigates whether the font memory car 13 is mounted on the printer or not (S 106). If the font memory card 13 is not mounted on the printer, a bit map font generating means generates the bit map font corresponding to the font which is instructed to print by the host unit 20 and writes the thus generated bit map font in the image memory 8 (S 107). Accordingly, the printing is carried out with use of the new generated bit map font.

If the font memory card 13 is mounted on the printer, the program goes to S 108, and a decision means decides as to whether the font which is instructed to print by the host unit 20 is stored in the font memory card 13.

The decision means at decision diamond S108 searches for the presence of the host-specified font based on the font type data and the character size data (S 108) in the font attribute table 200 provided in the memory space of the font memory card 13. If the first decision diamond decides that the host-selected font types and the character sizes are present in the font memory card 13, the program goes to a decision diamond S 109 where the character attribute table 300 is referenced. The processor 4 updates the frequency of use data $f_n$ 220 of the font attribute table 200 (S 110) so as to process the coefficient of the frequency of use if the character codes instructed to print by the host unit 20 exist in the character attribute table 300 (S 110) and writes the bit map font data for the host-selected font into the image memory 8 from the bit map area 136 of the font memory card 13 (S 111). Accordingly, the printing is carried out by use of the bit map font stored in the font memory card 13.

If the processor 4 decides in decision diamond S 108 that the host-selected font is *not* stored in the font memory card 13, the bit map font data generating means generates a new bit map font data based on the information of the printing font supplies by the host unit 20 and writes the thus generated bit map font data in the image memory 8. At the same time, the decision means refers to the flag T in the free block table and decides as to whether the free block table is present or not in the memory space of the font memory card 13 (S 112).

The decision means decides the presence of the free block in the following manner in S 112. That is, the decision means retrieves successively the state of flag $T_n$ from the highest-order block $BK_1$ of the free block table 400 to the lower-order blocks and decides that the block is free if the flag $T_n$ is a logical "0" and decides the free block is an area which is used by the font attribute address table 200. The flag $T_n$ corresponding to the free block is set to be a logical "1", thereby reserving the free block as the used area. Thereafter, the actual storage area is found by a predetermined calculation, thereby storing the data corresponding to the font attribute table 200 in the actual storage area.

If the processor 4 decides that the free block is *not* present in the memory space of the font memory car 13 in Step S112, processor 4 refers to a font managing table of the working memory 6 and decides whether the free area is present in the font cache memory 6b or not (S 113). If yes, then processor 4 writes the new generated bit map font data in the free area (S114), and writes the same bit map font data in the image memory 8 (S 115).

If the processor 4 decides that the free block table *is* present in the memory space of the font memory card 113 in Step 112, the processor 4 retrieves the free block from a free block table inspecting the state of the flag T therein and reserves the retrieved free block (S 116). The processor 4 stores the data of the font types and the character sizes which are instructed to print by the host unit 20 in the free block reserved in the font attribute table 200. The processor 4 stores e.g. the logical "0" as an initial value in other items of the font attribute table 200 (S 117).

Thereafter, the processor 4 prepared data for each item of the character attribute address table 300 based on character data instructed to print by the host unit 20 and investigates the presence of a free block for storing the prepared data in each item of the character attribute address table 300 (S 118). The retrieval is carried out in the same manner as made in the Step 112, namely, by successively investigating the state of the flag $T_m$ from the highest order block $BK_1$ to the lower order block of the block table 400 as shown in FIG. 6.

When the processor 4 retrieves the free block, it sets the flag $T_m$ corresponding to the free block to the logical value "1" and reserves the character attribute address table area (S 119).

The processor 4 writes SAD data and EAD data in the font attribute table after reserving the character attribute address table area (S 120).

Successively, the processor 4 retrieves a free area again in the free block table 300 by investigating the state of the flag $T_m$ (S 1221). If the free block is present, the processor 4 writes BSAD and BQ in the character attribute address table in the free block and stores the new generated bit map font data in the bit map font data block 512 corresponding to the bit map font area (S 122) and at the same time writes the same new generated bit map font data in the image memory 8 (S 123).

If the processor 4 decides in the Step 109 that the bit map font data of the character code which is instructed to print by the host unit 20 is not present in the character attribute table 300, the program goes to Step 118 where the processor 4 decides as to whether the free block is present in the memory space of the font memory card 13 by referring to the flag T. IF there is the free block, the program goes to Step 119 where the processor 4 stores the new generated bit map font into the free block table (S 112) and at the same time writes the new bit map font data in the image memory 8 (S 123).

If the processor 4 decides that the space area is not present in the font memory card 13 and in the font cache memory 6b by the judgement up to the Step 113, the processor 4 retrieves the font having the lowest frequency of use in the font memory card 13 using data 220 (FIG. 4), namely from the f's representing the frequency of use of the fonts in the font attribute table 200. The processor 4 erases the bit map font data and each item of the corresponding character attribute table 300 and the font attribute table 200 of the selected font having the lowest frequency of use and reserves the space area in the memory space of the font memory card 13 (S 125). Then, the program goes to Step 120 where the processor 4 stores each item data of the newly generated bit map font data character attribute table 300 and font attribute table 200 into the reserved free area so that the newly generated bit map font data is stored in the memory space of the font memory card 13 (S 122).

As illustrated in the arrows in FIG. 3, the data in the character attribute table 300 and the font attribute table 200 is stored from the starting address successively toward higher address whereas the bit map data is stored from the highest address of the bit map font area 136 toward the lower address.

It should be appreciated, therefore, that this manner of configuring or writing data into memory permits more effective use of the SRAM 130 and avoids, or at least diminishes, the disadvantage of largely-unused areas therein.

What is claimed is:

1. A printer provided with a font memory card, the printer comprising:
    an outline font ROM storing therein data representing outlines of printing characters and a control parameter for generating outline font data;
    a font memory card detachably connectable to the printer;
    a bit map font data generator for generating bit map font data for printing based on the data stored in the outline font ROM;
    a bit map font data storage location for storing the thus generated bit map font data in the font memory card;

a storage location for storing data about the frequency of use of the fonts or font types and character sizes; and a circuit effective for storing the thus generated bit map font data in the font memory card in an order based on said frequency of use data.

2. A printer provided with a font memory card according to claim 1, the printer having an input for receiving signals from a host control unit, the printer further comprising:

a font cache memory;

an image memory;

a first decision means for deciding as to whether a font designated by signals received at said input has been previously stored in said font cache memory of the printer;

a second decision means for deciding as to whether a font designated by signals received at said input has been previously stored in the font memory card;

characterized in that the bit map font data designated signals received at said input is written in said image memory when the first decision means decides that the designated font is stored in the font cache memory or the second decision means decides that the designated font is stored in the font memory card.

3. A printer provided with a font memory card according to claim 1, the printer having an input for receiving signals from a host control unit, the printer further comprising:

a font cache memory;

an image memory;

a first decision means for deciding as to whether a font designated by signals received at said input has been already stored in said font cache memory of the printer;

a second decision means for deciding as to whether a font designated by signals received at said input has been previously stored in the font memory card;

characterized in that the bit map font data having the least frequency of use among those stored in the font memory card is erased to reserve a free memory area and a new generated bit map font is stored in the free memory area reserved in the font memory card when the first decision means decides that the designated font is stored in the font cache memory and the second decision means decides that the designated font is not stored in the font memory card.

4. A printer provided with font data memory card according to claim 1, wherein the font data memory card detachably connected to the printer is a nonvolatile memory card.

5. A printer provided with font data memory card according to claim 1, wherein the font data memory card detachably connected to the printer is characterized in comprising:

a font attribute address table for storing therein and managing a frequency of use data corresponding to font types and character sizes, a starting address of a character attribute table and an ending address of the character attribute table; and the character attribute table representing storage addresses of bit map fonts corresponding to character codes of fonts designated by combinations of font types and character codes.

6. A method of operating a printer for printing in a selectable font, comprising the steps of:

maintaining outline font data in a printer memory;

generating bit map font data based on said outline font data;

storing the bit map font data;

storing data to represent the frequency of use of font types and font sizes that have actually been selected for printing;

printing in a selected font using the bit map font data.

7. The method of claim 6 wherein said bit map font data and said frequency of use data are stored on a detachable memory unit attached to said printer.

8. The method of claim 6 further comprising organizing the bit map font data in accordance with the frequency of use data.

9. The method of claim 8 further comprising deleting stored data corresponding to the least frequently used font as indicated by said frequency of use data.

10. The method of claim 9 wherein said deleting step occurs in response to specifying new font data.

* * * * *

UNITED STATES PATENT AND TRADEMARK OFFICE
CERTIFICATE OF CORRECTION

PATENT NO. : 5,138,696
DATED : August 11, 1992
INVENTOR(S) : MASATO NAGATA

Figure 8A:
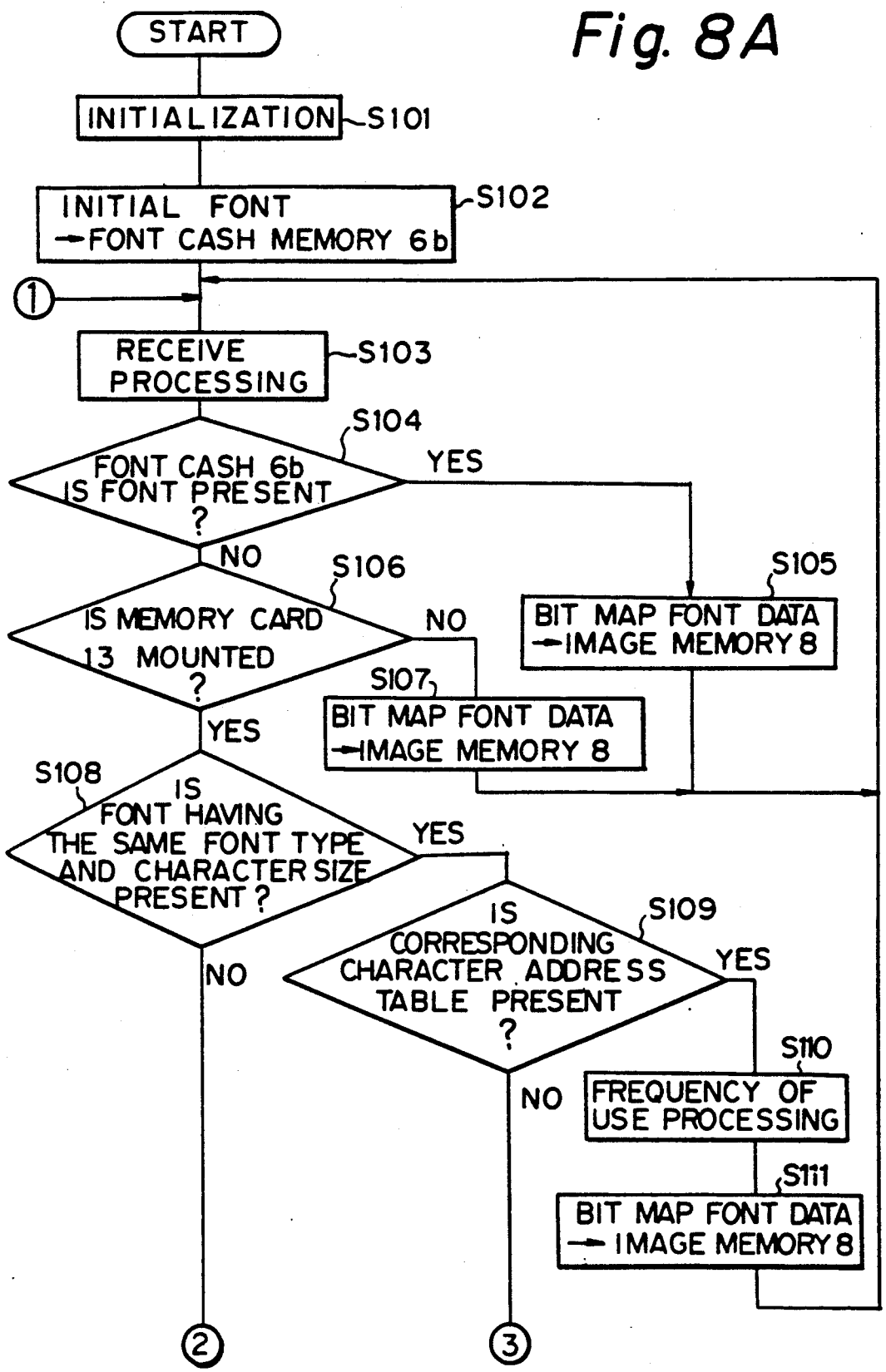
FIGS. 8(A), (B) and 8(C) are interrelated flowcharts showing operations for controlling the writing of the bit map font data in or the reading of the bit map font data from the font memory card of FIG. 2.
Figure 8B:
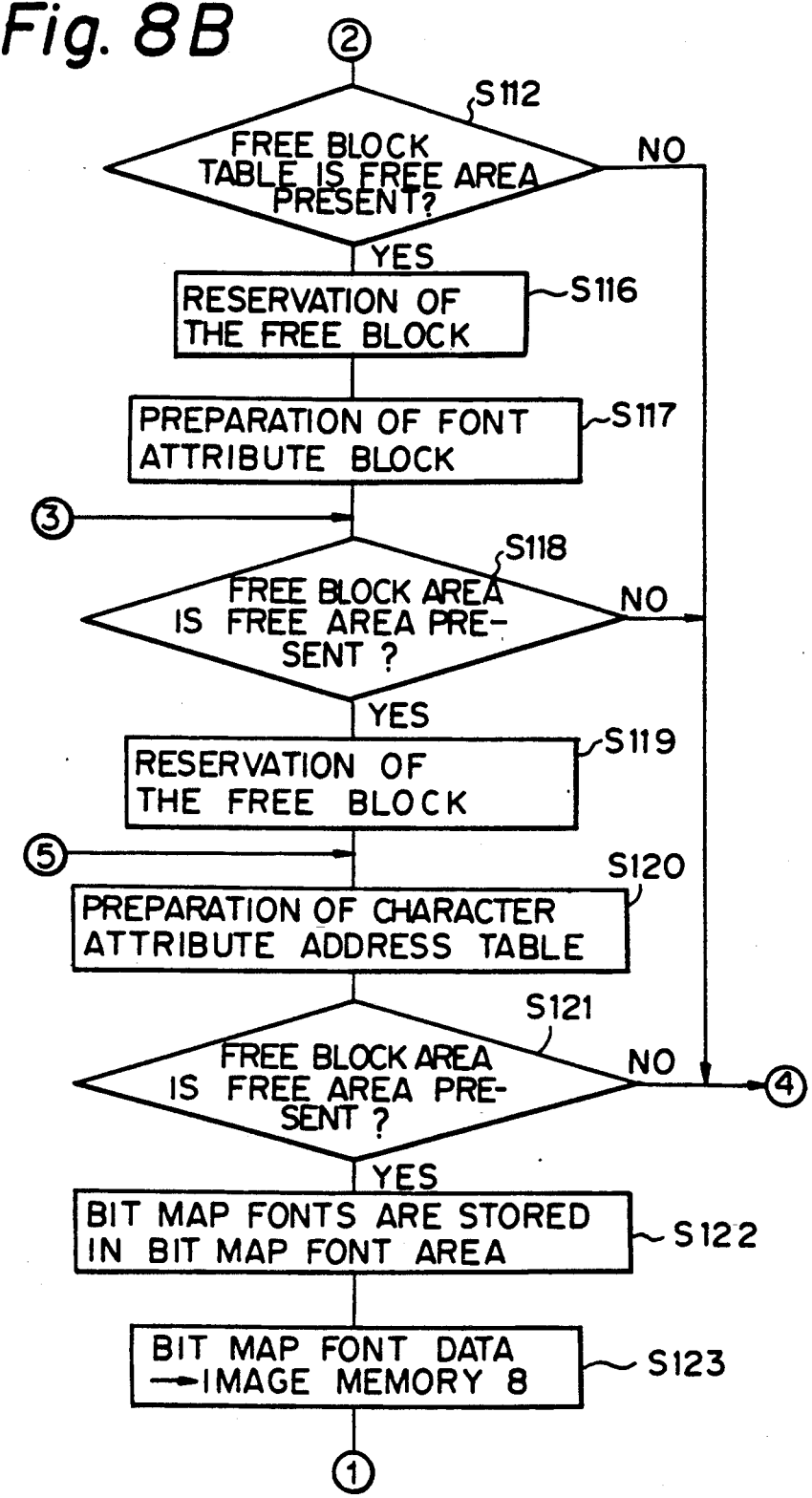

It is certified that error appears in the above-indentified patent and that said Letters Patent is hereby corrected as shown below:

Fig. 8A, block S102, "INITIAL FONT → FONT CASH MEMORY 6b" should read --INITIAL FONT → FONT CACHE MEMORY 6b--.

Fig. 8A, block S104, "FONT CASH 6b IS FONT PRESENT?" should read --FONT CACHE 6b IS FONT PRESENT?--.

Figure 8C:
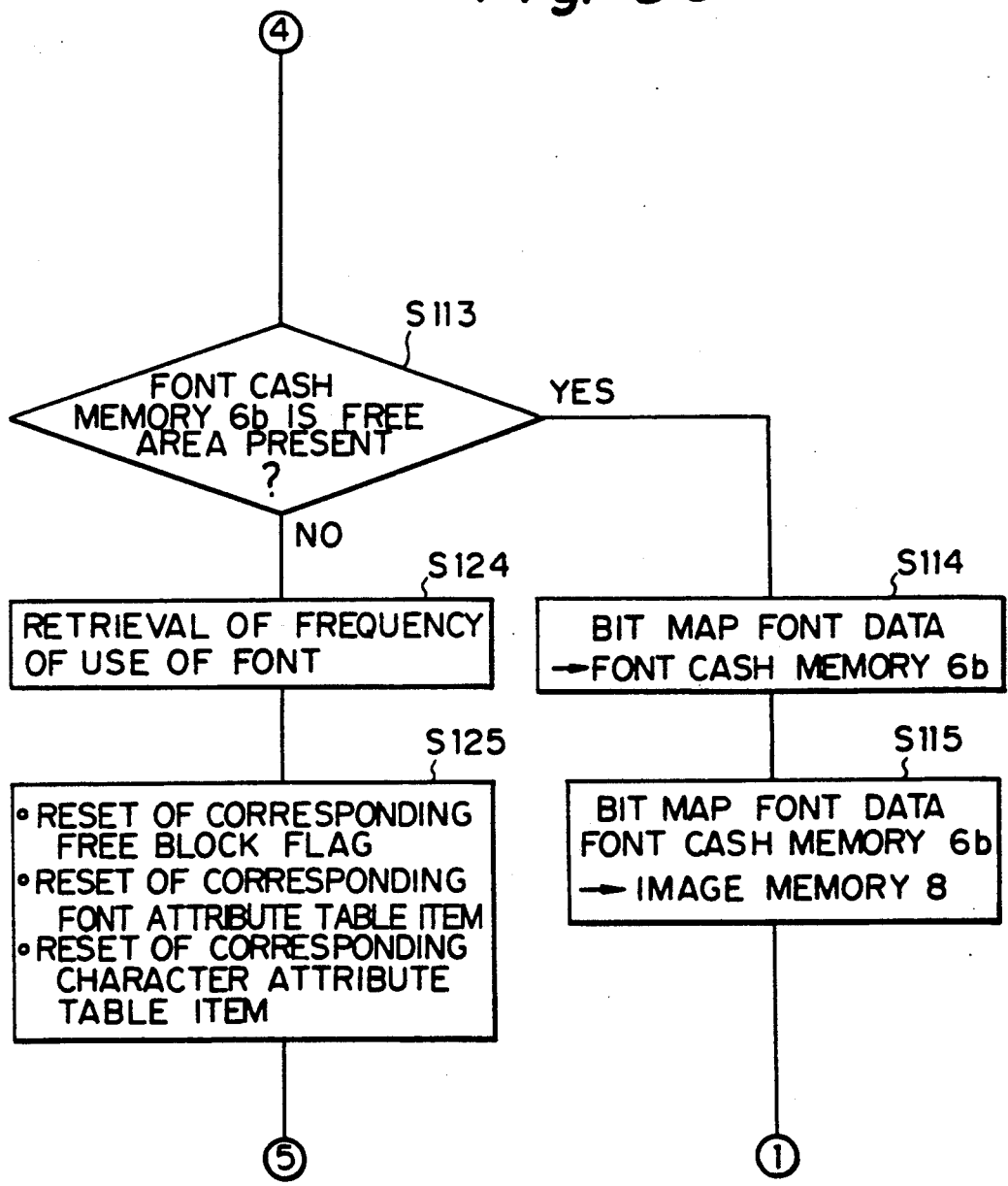

Fig. 8C, block S113, "FONT CASH MEMORY 6b IS FREE AREA PRESENT?" should read --FONT CACHE MEMORY 6b IS FREE AREA PRESENT?--.

Fig. 8C, block S114, "BIT MAP FONT DATA → FONT CASH MEMORY 6b" should read --BIT MAP FONT DATA → FONT CACHE MEMORY 6b--.

Fig. 8C, blocks S115, "BIT MAP FONT DATA FONT CASH MEMORY 6b → IMAGE MEMORY 8" should read --BIT MAP FONT DATA FONT CACHE MEMORY 6b → IMAGE MEMORY 8--.

Signed and Sealed this

Twenty-sixth Day of October, 1993

Attest:

BRUCE LEHMAN

*Attesting Officer*          *Commissioner of Patents and Trademarks*